(No Model.)
J. T. DILLEHAY.
VEHICLE BRAKE.
No. 295,740. Patented Mar. 25, 1884.
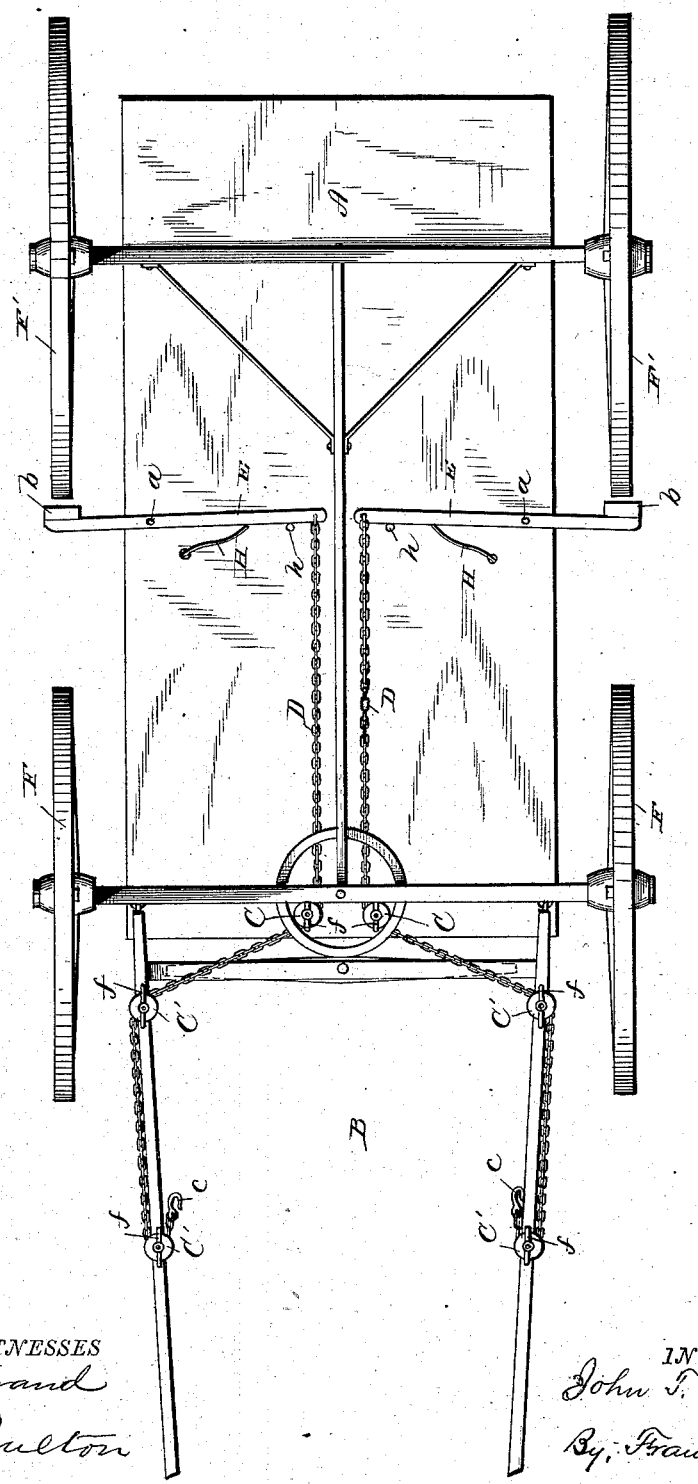
WITNESSES
F. L. Ourand
Geo. C. Poulton
INVENTOR
John T. Dillehay.
By. Frank A. Fouts
Attorney

UNITED STATES PATENT OFFICE.

JOHN T. DILLEHAY, OF BEECH GROVE, KENTUCKY.

VEHICLE-BRAKE.

SPECIFICATION forming part of Letters Patent No. 295,740, dated March 25, 1884.

Application filed February 4, 1884. (No model.)

*To all whom it may concern:*

Be it known that I, JOHN T. DILLEHAY, a citizen of the United States, residing at Beech Grove, in the county of McLean and State of Kentucky, have invented certain new and useful Improvements in Vehicle-Brakes, of which the following is a specification, reference being had therein to the accompanying drawing.

This invention has relation to vehicle-brakes; and it consists in the construction and arrangement of parts, as will be hereinafter described, and particularly pointed out in the claim.

The figure of the drawing illustrates a vehicle with the bottom of the body and the shafts having my invention attached thereto.

The letter A represents the bottom of a vehicle-body, mounted upon axles, and provided with front and rear wheels, F and F', connected together by an ordinary coupling-pole. The forward end of the under side of the vehicle-body is provided with grooved pulleys C C.

The letter B designates the shafts of the vehicle, having on their under sides, at suitable distances apart, pulleys C', corresponding to those on the under side of the vehicle-body.

The letters E E denote the brake-levers, which are pivoted to the under side of the vehicle-body, as shown at *a*, and they are provided with brake-blocks *b b* at their outer ends, while their inner ends have connected to them chains, cords, or other suitable connections, D D, which I prefer to be made round in form. These chains connect with the pulleys C C at the front end of the vehicle-body, and from thence are connected with the pulleys C' on the under side of the shafts, as aforesaid. The pulleys are provided with staples *f*, to prevent the chains from getting out of the grooves thereof. The chains D D, at their outer ends, are provided with hooks *c c*, which are adapted to be secured to the breeching-strap, or in the rings thereof.

The letters H H represent springs, which are secured at their outer ends to the vehicle-body, as shown, while their inner ends are connected to the brake-levers, for a purpose hereinafter described.

The operation of my brake-lever is as follows: When the horse is going downhill or holding back, the chains D D, by means of their hooks *c* being attached to the breeching, bring the inner ends of the levers E E forward, and the brake-blocks *b b* are pressed tightly against the rims of the wheels F' F'. When this holdback movement ceases by the animal moving forward in the shafts, the brake-levers are thrown backward by means of the springs H H, thus releasing the brake-blocks from the rims of the wheels F' F'. When it is desired to back the horse, the driver presses his foot upon a spring in the bottom of the vehicle, (not shown,) which causes the stop-pins *h h* to come in contact with the front portion of the levers, thus preventing them from coming forward, and bringing the brake-blocks in contact with the rims of the rear wheels.

Having now described my invention and explained the operation thereof, what I claim is—

The vehicle-brake herein described, consisting of the body A, having the spring-pivoted brake-levers E and pulleys C, the shafts B, having the pulleys C' arranged at suitable intervals thereon; the chains D D, secured to the levers at their inner ends, and passing around the pulleys C and C', and provided with hooks *c* at their outer ends, and the stop-pins *h*, as shown and described.

In testimony whereof I affix my signature in presence of two witnesses.

JOHN T. DILLEHAY.

Witnesses:
J. D. ATCHISON,
S. R. EWING.